United States Patent
Ye et al.

(10) Patent No.: US 8,451,252 B2
(45) Date of Patent: May 28, 2013

(54) IMAGE SENSOR FOR TOUCH SCREEN AND IMAGE SENSING APPARATUS

(75) Inventors: Xinlin Ye, Beijing (CN); Jianjun Liu, Beijing (CN); Zhonghua Liu, Beijing (CN); Xinbin Liu, Beijing (CN)

(73) Assignee: Beijing Intouch Co., Ltd., Beijing (CN)

( * ) Notice: Subject to any disclaimer, the term of this patent is extended or adjusted under 35 U.S.C. 154(b) by 309 days.

(21) Appl. No.: 12/921,696

(22) PCT Filed: Apr. 29, 2009

(86) PCT No.: PCT/CN2009/071564
§ 371 (c)(1),
(2), (4) Date: Nov. 23, 2010

(87) PCT Pub. No.: WO2009/132590
PCT Pub. Date: Nov. 5, 2009

(65) Prior Publication Data
US 2011/0063256 A1   Mar. 17, 2011

(30) Foreign Application Priority Data
Apr. 30, 2008   (CN) .......................... 2008 1 0105559

(51) Int. Cl.
*G06F 3/042*   (2006.01)
(52) U.S. Cl.
USPC ........................................ 345/175; 345/179
(58) Field of Classification Search
USPC ....................................................... 345/175
See application file for complete search history.

(56) References Cited

U.S. PATENT DOCUMENTS

| | | | | | |
|---|---|---|---|---|---|
| 4,553,842 | A | * | 11/1985 | Griffin | 356/621 |
| 4,782,328 | A | * | 11/1988 | Denlinger | 341/5 |
| 5,484,966 | A | * | 1/1996 | Segen | 178/18.09 |

(Continued)

FOREIGN PATENT DOCUMENTS

| | | |
|---|---|---|
| CN | 1860431 A | 11/2006 |
| CN | 201035553 Y | 3/2008 |
| CN | 101261557 A | 9/2008 |
| CN | 101369202 A | 2/2009 |

OTHER PUBLICATIONS

Semat et al, "Physics, Chapter 38: Mirrors and Lenses", University of Nebraska-Lincoln DigitalCommons@University of Nebraska-Lincoln, 1958, pp. 1-25.*

(Continued)

*Primary Examiner* — Dorothy Harris
(74) *Attorney, Agent, or Firm* — Banner & Witcoff, Ltd.

(57) ABSTRACT

An image sensor for a touch screen, which is installed at an edge of the touch screen and comprises an image sensing element and an optical imaging system, wherein the optical imaging system comprises: at least two separated lenses to constitute at least two optical paths, wherein each of the lenses includes a concavo-convex lens, an objective lens of each of the lenses is faced to the touch screen, an overlapping area of fields of the view of the objective lenses covers the touch screen, a touch object on the touch screen is imaged by each of the optical paths in the optical imaging system respectively, and the formed image is projected on the image sensing element. The image sensor can locate the touch object by utilizing stereo photography. Moreover, the optical imaging system can utilize the interlocked electronic shutters to realize time division multiplex of the image sensing element by the different optical paths, or utilize individual optical paths to realize area division multiplex of the image sensing element.

11 Claims, 8 Drawing Sheets

U.S. PATENT DOCUMENTS

| | | | |
|---|---|---|---|
| 6,335,724 B1* | 1/2002 | Takekawa et al. | 345/173 |
| 6,654,007 B2* | 11/2003 | Ito | 345/175 |
| 6,943,779 B2* | 9/2005 | Satoh | 345/173 |
| 7,557,935 B2* | 7/2009 | Baruch | 356/614 |
| 2001/0026268 A1* | 10/2001 | Ito | 345/175 |
| 2005/0078095 A1* | 4/2005 | Ung et al. | 345/175 |
| 2007/0089915 A1 | 4/2007 | Ogawa et al. | |
| 2008/0062149 A1* | 3/2008 | Baruk | 345/175 |
| 2011/0074738 A1* | 3/2011 | Ye et al. | 345/175 |

OTHER PUBLICATIONS

Fessler, Optical Imaging Basics, downloaded Nov. 13, 2012 http://www-personal.umich.edu/~hyunjinp/notes/n-optic.pdf?bcsi-ac-87a1566f7576e15c=1EA30B5D00000102njJX12WMg5upidGx7z lxpRMW2h27SgAAAgEAADaiGAGEAwAAAgAAADnDfgA=, Jan. 7, 2005, pp. 1-12.*

International Search Report for PCT/CN2009/071564 (WO 2009/132590) mailed Jul. 23, 2009.

* cited by examiner

IMAGE SENSOR FOR TOUCH SCREEN AND IMAGE SENSING APPARATUS

TECHNICAL FIELD OF THE INVENTION

The invention relates to an image capturing and sensing apparatus for an infrared touch screen and belongs to optics and photography technology, especially to the photography technology using an image sensor to locate for a touch screen or an electronic whiteboard.

BACKGROUND OF THE INVENTION

There are various touch screens for a computer which have different structures. A touch screen using photoelectric technology comprises an infrared touch screen using infrared emitting and receiving tubes and a camera touch screen using a camera to detect a location of a touch object. The principle of infrared touch screen is simple, but because a large number of infrared elements are used, its design, production, installation and debugging are complex, which leads to higher production costs. Moreover, because the infrared emitting tube would age, the life time of the infrared touch screen is not very long. Additionally, the infrared touch screen has a lower physical resolution. The technical principle and solution of the infrared touch screen can be found in U.S. Pat. Nos. 3,764,813, 3,860,754, 3,775,560 and 6,429,857 and a Chinese patent application No. 0012462.4. The touch screen with an image sensor (camera) has advantages of high hardware integration, simple structure and lower production costs, but in the prior art, at least two cameras can constitute an image detecting system for a touch screen. Therefore, two sets of micro-computer systems for image processing are necessary, which causes high hardware cost. The work principle and technical solution of such technology can be found in a German patent No. DE20016024549.

SUMMARY OF THE INVENTION

An embodiment of the present invention is aimed at the defects of the existing computer touch screen using photoelectric technology and provides a structure scheme of a computer touch screen which uses minimum image sensors and reduces hardware cost of the computer touch screen.

According to the embodiment of the present invention, an image sensing apparatus for a touch screen is installed at an edge of the touch screen and comprises an image sensing element and an optical imaging system, wherein the optical imaging system comprises: at least two separated lenses to constitute at least two optical paths, wherein each of the lenses includes a concavo-convex lens, an objective lens of each of the lenses is faced to the touch screen, an overlapping area of fields of view of the objective lenses covers the touch screen, a touch object on the touch screen is imaged by each of the optical paths in the optical imaging system, and the formed images are projected on the image sensing element.

The image sensing apparatus for the touch screen of the embodiment comprises an image sensor comprising the image sensing element and the optical imaging system, and a control processor for controlling operation of the image sensor and processing signals received by the image sensor, and is installed at the edge of the detected screen. In the present invention, the optical imaging system includes at least two optical paths and comprises at least two lenses each including a concavo-convex lens, wherein the objective lenses of the two lenses are separated from each other and faced to the screen and the overlapping area of their fields of view covers the screen; there is one image sensing element, and the images formed by the at least two optical paths are projected on the surface of the image sensing element.

Theoretically, the embodiment can be implemented as long as the optical imaging system comprises two optical paths. Because image information of the touch object can be obtained concurrently by means of the two optical paths, the location of the touch object in space can be obtained by using stereo photography technology. Thus, the embodiment will be illustrated by way of two optical paths as an example.

The embodiment comprises two kinds of feasible specific structures. One structure is that at least two optical paths share one image sensing element in a time division manner. For such structure, an electronic shutter is installed on each of the at least two the optical paths in the optical imaging system. The electronic shutters are controlled and driven by the control processor to open and close sequentially in an interlocked manner. In this structure, a reflection mirror and a reflection/transmission mirror are included on the two optical paths, and the reflection surface of the reflection mirror is opposite to the reflection surface of the reflection/transmission mirror. On one optical path, light reaches a surface of the image sensing element after twice reflected by a reflection surface of the reflection mirror and a reflection surface of the reflection/transmission mirror. On the other optical path, light reaches the surface of the image sensing element through a transmission surface of the reflection/transmission mirror. Further, in order to obtain an effective field of view as large as possible to cover a display screen with a larger size, another reflection mirror for changing propagation direction of the light can be used on the two optical paths to extend distance between the two lenses and adjust an angle between the lenses.

The other structure is that the two optical paths share one image sensing element in an area division manner, the image sensing element is partitioned into two image sensing areas, and the images formed by the two paths are projected on the areas respectively. However, more generally, two reflection mirrors are installed in front of the two areas of the image sensing element, so that the light passing through the lenses on the two optical paths is projected on the two areas after it is reflected by the two reflection mirrors, respectively.

No matter what kind of the structure it is, the embodiment can use the following technical solution: each of the two optical paths comprises two lenses, wherein a first lens is installed at the edge of the detected screen, preferably the first lenses on the two optical paths are installed at adjacent corners, and an imaging screen is installed at an image position of the first lens; an objective lens of a second lens is faced to the imaging screen of the first lens. Here, according to general optical theory, preferably the first lens is a wide-angle lens, and the second lens is a telephoto lens. Thus a large field of view for detection can be obtained using the wide-angle lens, and the image on the imaging screen by the wide-angle lens can be captured using the telephoto lens.

In the above technical solution where each optical path comprises two lenses, the first lens can be replaced with a convex mirror which is installed at the edge of the detected screen, preferably the convex mirrors are installed at the adjacent corners, and the reflection surface of which is faced to the detected screen; the objective lens of the second lens is faced to the reflection surface of the convex mirror.

No matter what kind of structure it is, in some special cases, the following simplest structure can be used: at least two lenses are installed in front of the image sensing element, so that the images can be projected on the entire photosensitive area of the image sensing element by the electronic shutters or be projected on the surfaces of partitioned photosensitive areas respectively, simply, on the respective photosensitive area corresponding to each lens.

It can be seen from the above description that the embodiment uses the structure where two or more optical paths corresponds to one image sensor (camera), and locates the touch object by utilizing the stereo photography function, thus the number of hardware and production cost can be reduced.

Description of the reference signs are:

101: display screen for touch operation; 102: image sensing element; 103, 105, 106: reflection mirrors; 104: reflection/transmission mirror; 107, 108: switches on the optical paths; 109: the simplest optical path; 201, 205: the first lens on each optical path; 202, 206: imaging screen of the first lens; 203, 207: the second lens on each optical path; 208: reflection mirror; 301, 302: two longitudinal areas formed by dividing a photosensitive surface of the image sensing element; 401, 402: reflection mirrors for replacing 104, 105 or 104, 208; 501, 502: reflection mirrors for replacing 104, 208; 701: convex mirror; 801, 802: multi-mode fiber; 901, 902: a lens group including a convex lens.

In the drawings, a thin solid line with an arrow indicates the propagation direction of the light.

DETAILED DESCRIPTION OF THE PREFERRED EMBODIMENTS

Figure 1:
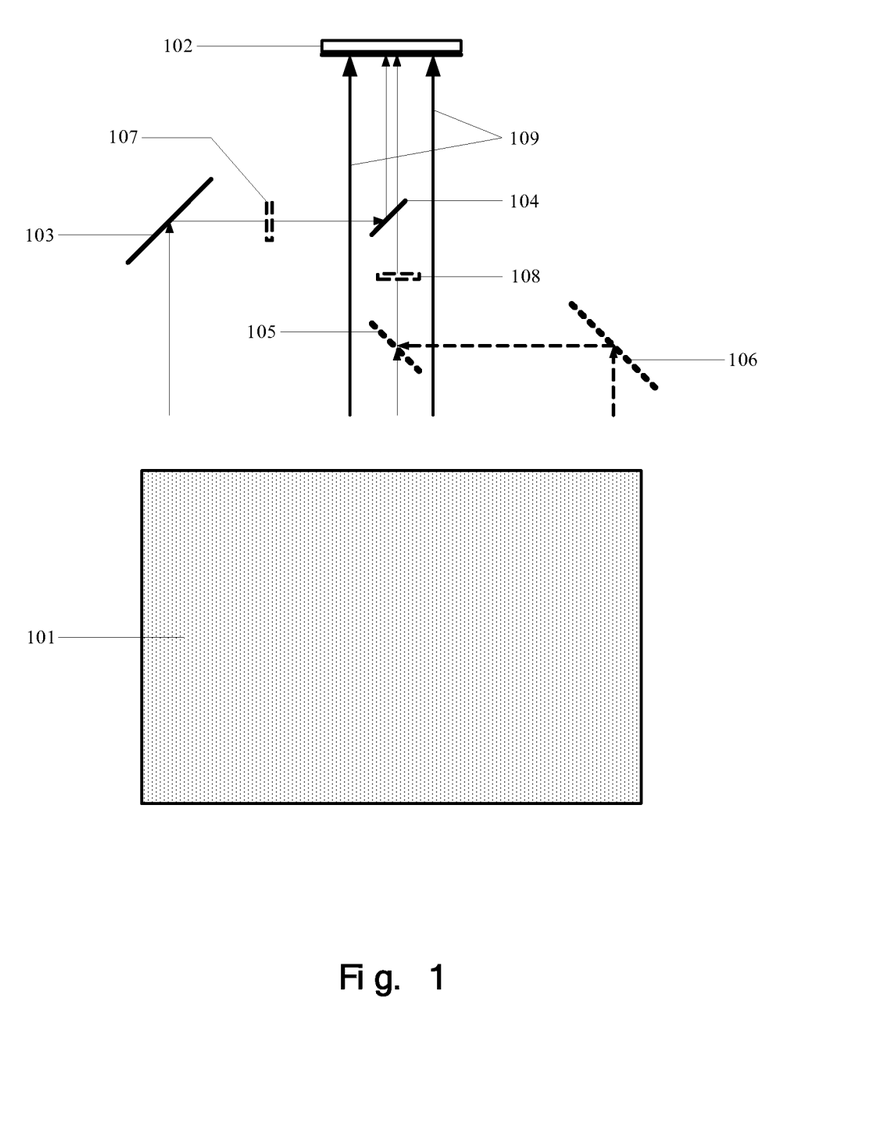
FIG. 1 is a diagram illustrating the basic optical principle of the embodiments according to the present invention.
Figure 1A:
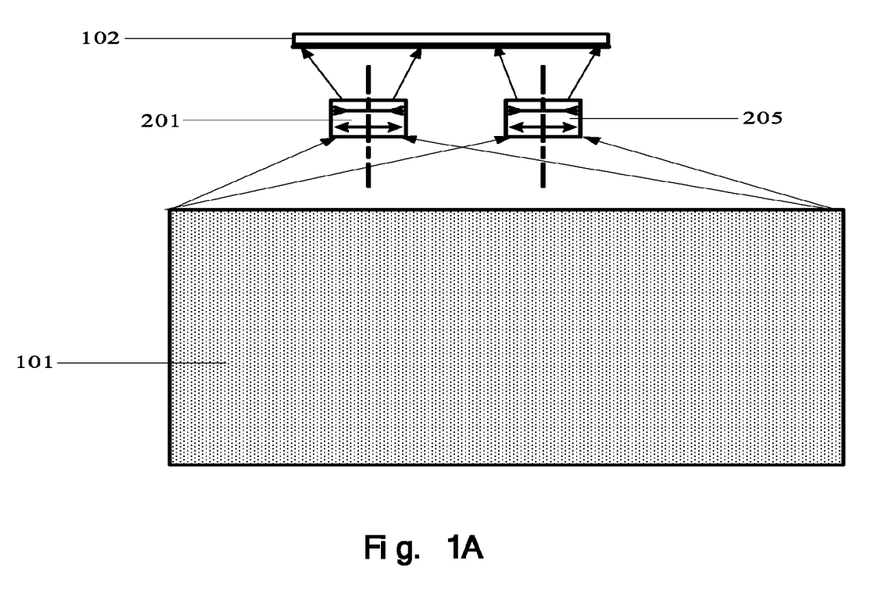
FIG. 1A is a structure diagram of a first embodiment according to the present invention.
Figure 1B:
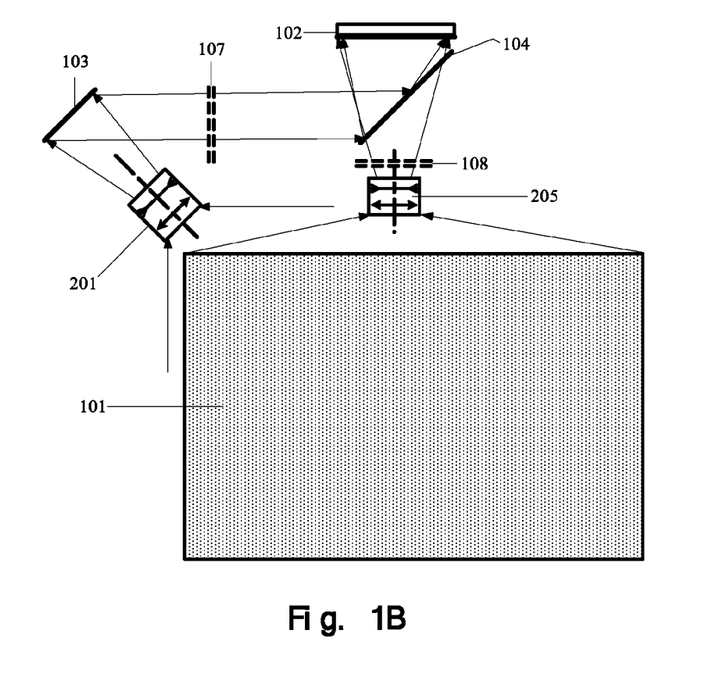
FIG. 1B is a structure diagram of a second embodiment according to the present invention.
Figure 1C:
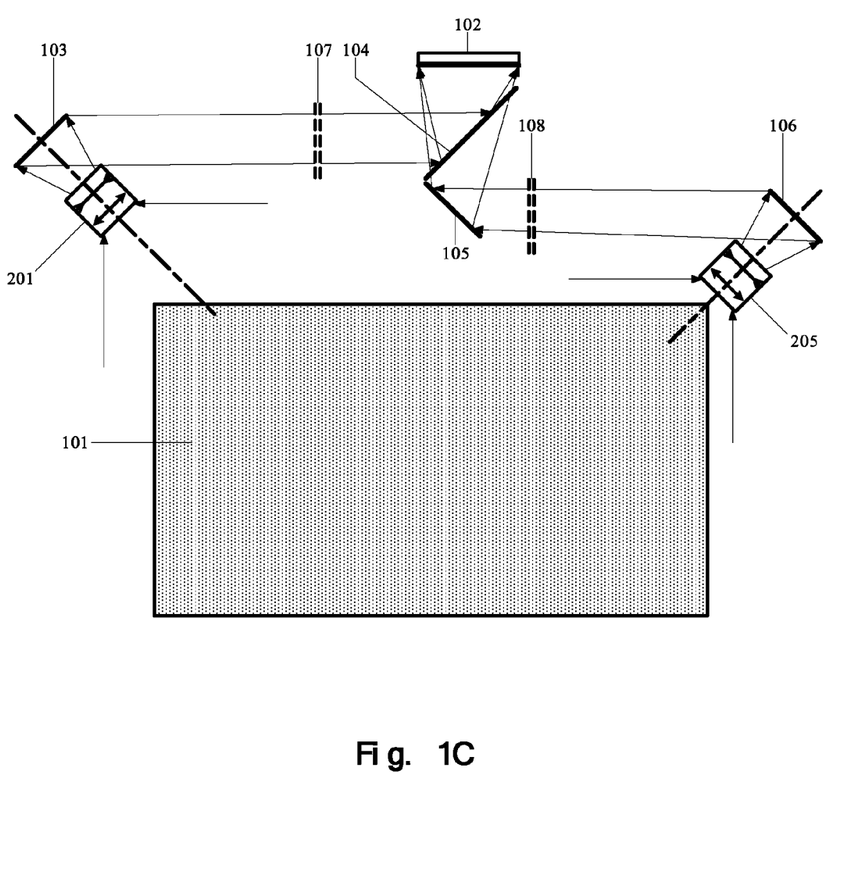
FIG. 1C is a structure diagram of a third embodiment according to the present invention.

FIG. 1 shows a schematic diagram of a basic optical path structure according to the present invention, which illustrates the basic principle of various solutions realizing the present invention by way of two optical paths. As shown in FIG. 1, there are two optical paths comprising the lenses. The final images formed by the two optical paths are projected on the photosensitive surface of the image sensing element 102. The simplest way of this structure is to install at least two lenses in front of the image sensing element, and the images of the two lenses are projected on the photosensitive surface of the image sensing element 102, as indicated by two thick solid line arrows 109. The specific embodiment is shown in FIG. 1A. This apparatus can be mainly applied to some cases with small size or low cost. The image sensing apparatus shown in FIG. 1A comprises the image sensor including the image sensing element 102 and the optical imaging system, and a control processor (not shown) for controlling operation of the image sensor and processing signals received by the image sensor. The apparatus is installed at the edge of the display screen 101 for touch operation, wherein the optical imaging system includes two optical paths. The lens 201 is located on one optical path in the optical imaging system, and the light reaches the image sensing element 102 through the lens 201. The lens 205 is located on the other optical path in the optical imaging system, and the light reaches the same image sensing element 102 through the lens 205. As shown in FIG. 1A, the objective lenses of the lenses 201 and 205 are separated from each other and faced to the display screen 101, and the overlapping area of the fields of view of the two lenses 201 and 205 covers the display screen 101. The apparatus is installed at the edge of the display screen 101. But more generally, the light on one optical path reaches the photosensitive surface of the image sensing element directly through the reflection/transmission mirror 104, while the light on the other optical path reaches the photosensitive surface of the image sensing element after it is reflected by the reflection mirror 103 as a first reflection mirror, as indicated by the thin solid lines with arrows. The specific embodiment is shown in FIG. 1B. The image sensing apparatus shown in FIG. 1B comprises the image sensor including the image sensing element 102 and the optical imaging system, and the control processor (not shown) for controlling the operation of the image sensor and processing signals received by the image sensor. The apparatus is installed at the edge of the display screen 101, wherein the optical imaging system includes two optical paths. The lens 201, the reflection mirror 103, the reflection/transmission mirror 104 and the corresponding light are on the first optical path, wherein the light or the light reflected by an object reaches the reflection mirror 103 through the lens 201, reaches the reflection/transmission mirror 104 after reflected by the reflection mirror 103, and finally reaches the image sensing element 102 after reflected by the reflection surface of the reflection/transmission mirror 104. The lens 205, the reflection/transmission mirror 104 and the corresponding light are on the second optical path, wherein the light or the light reflected by the object reaches the reflection/transmission mirror 104 through the lens 205, and then reaches the image sensing element 102 through the transmission surface of the reflection/transmission mirror 104. According to the light propagation path of each optical path, the object on the display screen 101 is imaged by each optical path of the apparatus, and the formed images by the optical paths of the apparatus are finally projected onto the same image sensing element 102, that is, there are the images of the object on the display screen 101 formed by the respective optical paths of the apparatus on the image sensing element 102. For this embodiment, there are two images of the same object formed on the image sensing element 102 by the two optical paths of the apparatus. It can be seen from FIG. 1B that the objective lenses of the lenses 201 and 205 are separated from each other and faced to the display screen 101, the overlapping area of the fields of view of the lenses 201 and 205 covers the display screen 101, and the apparatus is installed at the edge of the display screen 101. For the apparatus shown in FIG. 1B, it would be preferable that the distance between the objective lenses of the two lenses on the two optical paths is short in order to make the two optical paths have same length to reduce the difficulty of design and manufacture. With this structure, the overlapping area of the fields of view is larger and may cover the display screen 101 with a larger size, but the precision of locating the touch object is low due to the little difference between the two images. If the objective lenses of the two lenses are far away from each other, the length difference between the optical paths would be large, thus it could be more difficult to make a design and manufacture. It is even required to adjust the angles of optical axes of the lenses to obtain the maximum overlapping field of view to cover the display screen 101 with a larger size. Thus, one straight-through optical path cannot meet the requirement. Therefore, another improved structure is given in FIG. 1C. In such structure, the reflection mirrors 106,105 as the second and third reflection mirrors are installed on the optical path in which the light is transmitted through the reflection/transmission mirror, and the light passes through the reflection/transmission mirror after two reflections. The path through which the optical element and the light pass is indicated by the dotted lines. As shown in FIG. 1C, the image sensing apparatus comprises the image sensor including the image sensing element 102 and the optical imaging system, and the control processor (not shown) for controlling the operation of the image sensor and processing signals received by the image sensor. The apparatus is installed at the edge of the display screen 101. The optical imaging system includes two optical paths. There are the lens 201, the reflection mirror 103, the reflection/transmission mirror 104 and the corresponding light on the first optical path. The light or light reflected by the object reaches the reflection mirror 103 through the lens 201, reaches the reflection/transmission mirror 104 after reflected by the reflection mirror 103, and then reaches the image sensing element 102 after reflected by the reflection surface of the reflection/transmission mirror 104. There are the lens 205, the reflection mirror 105, the reflection mirror 106, the reflection/transmission mirror 104 and the corresponding light on the second optical path. The light or light reflected by the object reaches the reflection mirror 106 through the lens 205, then the light reaching the reflection mirror 106 is reflected to the reflection mirror 105, and reaches the reflection/transmission mirror 104 through the reflection mirror 105, and then reaches the image sensing element 102 through the transmission surface of the reflection/transmission mirror 104. According to the light propagation path of each optical path, the object on the display screen 101 is imaged by each optical path, and the formed images by the optical paths are finally projected onto the same image sensing element 102, that is, there are the images of the object on the display screen 101 formed by the optical paths. In this embodiment, there are two images of the same object formed on the image sensing element 102 by the two optical paths. It can be seen from FIG. 1C that the objective lenses of the lenses 201 and 205 are separated from each other and faced to the display screen 101, the overlapping area of the fields of view of the lenses 201 and 205 covers the display screen 101, and the apparatus is installed at the edge of the display screen 101. The embodiments of the present invention have been described with reference to FIGS. 1A, 1B and 1C in which the optical imaging system includes only two optical paths, but the optical imaging system can also be designed to include two or more optical paths, e.g. the optical imaging system is designed to include three optical paths. In such structure, all the objective lenses are separated from each other and faced to the display screen 101, the overlapping area of the fields of view of all the lenses covers the display screen 101, and the apparatus is installed at the edge of the display screen 101.

Figure 2:
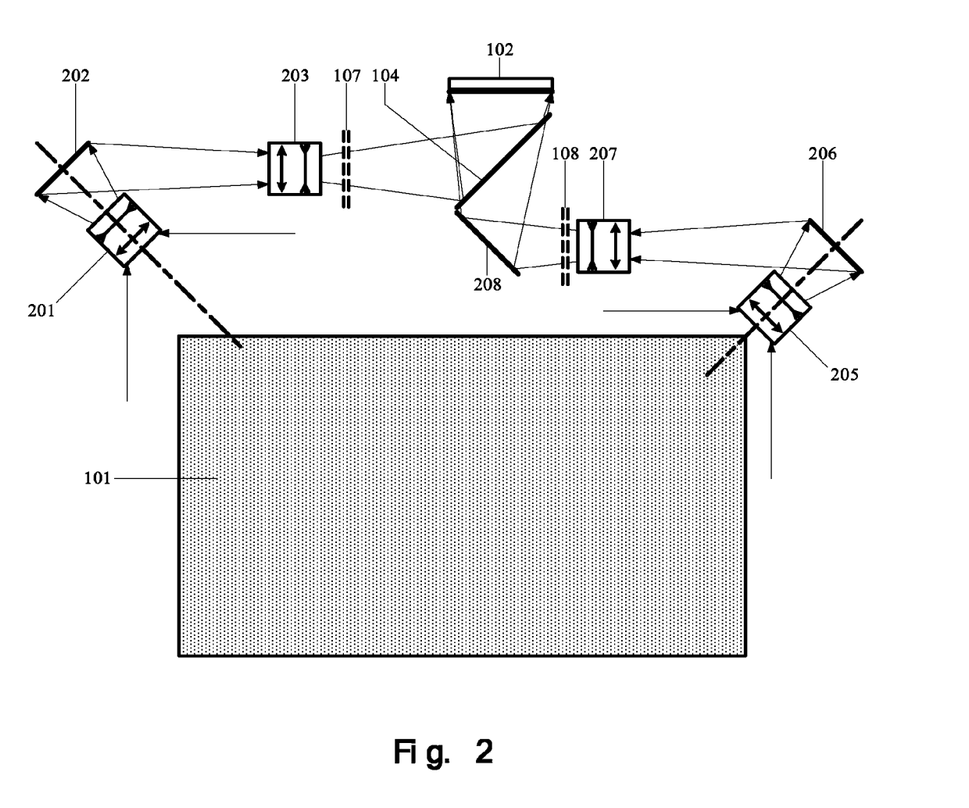
FIG. 2 is a structure diagram of a fourth embodiment according to the present invention.

In the embodiments, there are two solutions utilizing the same image sensing element to capture two videos, one is time division multiplex of the same propagation path by different optical paths or area division multiplex of individual optical paths. These two technical solutions can be implemented by modifying the structure in FIG. 1 in part. In the case of time division multiplex, the electronic shutters 107 and 108 are inserted into the two optical paths shown in FIG. 1 respectively, and the control processor (not shown) for controlling the operation of the image sensor and processing signals received by the image sensor is used to control and drive the two electronic shutters to open and close sequentially in an interlocked manner, then the image sensing element can capture the images from the two optical paths sequentially. For example, the electronic shutters 107 and 108 are inserted into the optical paths respectively in FIGS. 1B and 1C. After the electronic shutters 107 and 108 are inserted into the optical paths respectively, the apparatus shown in FIG. 1B and FIG. 1C captures the video on each optical path in the time division multiplex manner. FIG. 2 shows a specific structure of the optical path employing the time division multiplex based on the principle of FIG. 1. The image sensing apparatus for the touch screen shown in FIG. 2 comprises the image sensor including the image sensing element 102 and the optical imaging system, and the control processor (not shown) for controlling the operation of the image sensor and processing signals received by the image sensor, and the apparatus is installed at the edge of the display screen 101. The optical imaging system includes two optical paths. There are the lens 201, the imaging screen 202 for the lens 201, the lens 203 as the second lens, the electronic shutter 107, the reflection/transmission mirror 104 and the corresponding light on one optical path. The light reflected by the object or emitted by the object reaches the imaging screen 202 through the lens 201, and is imaged on the imaging screen 202. Then the light reaches the reflection/transmission mirror 104 through the lens 203 and the electronic shutter 107, and reaches the image sensing element 102 after reflected by the reflection surface of the reflection/transmission mirror 104. There are the lens 205, the imaging screen 206 for the lens 205, the lens 207 as the second lens, the reflection mirror 208, the electronic shutter 108, the reflection/transmission mirror 104 and the corresponding light on the other optical path. The light reflected by the object or emitted by the object reaches the imaging screen 206 through the lens 205, and forms the image on the imaging screen 206. Then the light reaches the reflection mirror 208 through the lens 207 and the electronic shutter 108, reaches the reflection/transmission mirror 104 after reflected by the reflection mirror 208, and then reaches the image sensing element 102 through the transmission surface of the reflection/transmission mirror 104. The control processor (not shown) for controlling the operation of the image sensor and processing signals received by the image sensor controls and drives the two electronic shutters 107 and 108 to open and close sequentially in an interlocked manner, thus the image sensing element can capture the images through the two optical paths sequentially. According to the light propagation path of each optical path, the object on the display screen 101 is imaged by each of the optical paths of the apparatus, and the formed images by the optical paths are finally projected onto the same image sensing element 102, that is, there are the images of the object on the display screen 101 formed by the optical paths. In this embodiment, there are two images of the same object formed on the image sensing element 102 by the two optical paths. The two optical paths in FIG. 2 comprise the first lenses 201, 205 installed at the edge of the detected screen, preferably at the two adjacent corners, and the second lenses 203, 207 respectively. The first lenses form images on the screens 202 and 206 respectively, and the second lenses pick up the images on the imaging screens 202 and 206 and project them on the image sensing element 102 through the reflection/transmission mirror 204 and the reflection mirror 208 respectively. Here, preferably, the first lens is a wide-angle lens, and the second lens is a telephoto lens. Thus the wide-angle lens can obtain large detection field of view, and then the telephoto lens can capture the images by the wide-angle lens on the imaging screens. In this embodiment, the lenses faced to the touch screen are the lenses 201 and 205, but not including the lenses 203 and 207.

Figure 3:
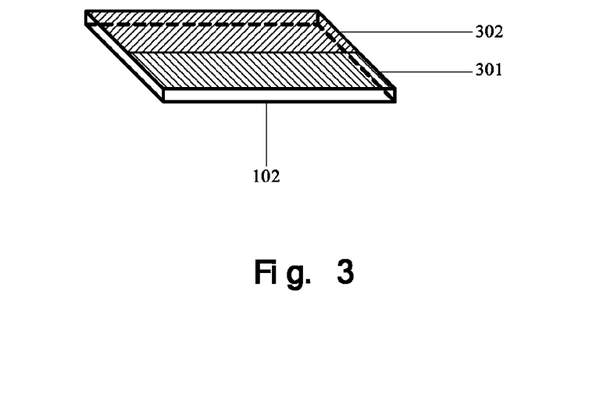
FIG. 3 is a schematic diagram illustrating area division of the image sensing element.
Figure 4:
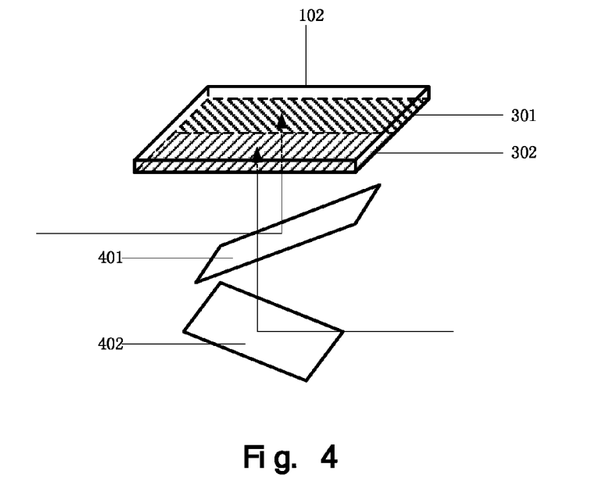
FIG. 4 is a schematic structure diagram of a reflection mirror when the image sensing element employs area division multiplex in the structure of FIG. 2.
Figure 5:
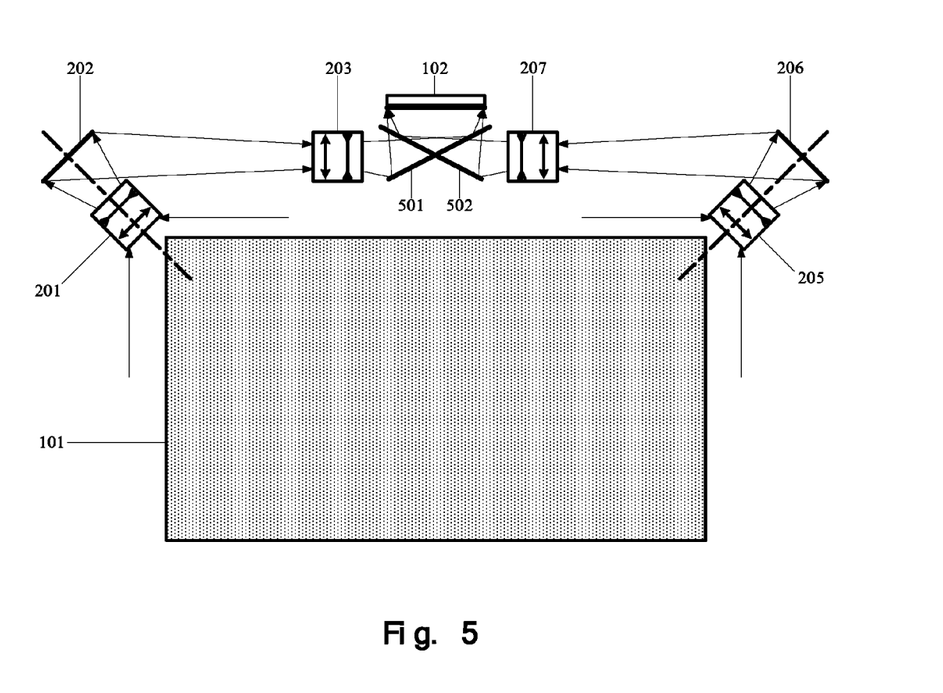
FIG. 5 is a schematic structure diagram of the optical paths when the image sensing element employs area division multiplex in the structure of FIG. 2.
Figure 6:
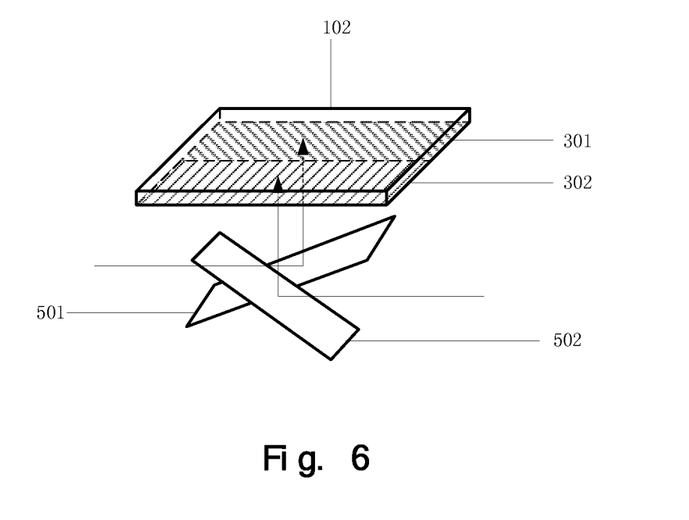
FIG. 6 is a schematic structure diagram of the reflection mirror in the structure of FIG. 5.

The basic principle of the area division multiplex is shown in FIG. 3. The photosensitive surface of the image sensing element is partitioned into two areas 301 and 302 on which the images from the two optical paths are projected respectively. Here is a schematic diagram of longitudinal partition, in which the photosensitive surface is partitioned along the direction parallel to the surface of the detected screen 101, so that the higher resolution can be obtained by utilizing the maximum number of pixels of the long side of the image sensing element. Thus, the electronic shutters and transmission/reflection mirror can be omitted, and the parameters of the two optical paths are more balanced to facilitate design and manufacture. The optical imaging system in FIG. 3 has only two optical paths and the photosensitive surface of the image sensing element is partitioned into two areas. However, when the optical imaging system includes more than two optical paths, the image sensing element is partitioned into the same number of image sensing areas as the optical paths. The images through the two optical paths of the optical imaging system are projected on the two areas respectively. When the optical imaging system includes four optical paths, the photosensitive surface of the image sensing element should be partitioned into four image sensing areas. FIG. 5 shows the structure of the optical paths employing area division multiplex based on the principle of FIG. 1. Similar to FIG. 2, the two optical paths in FIG. 5 comprise the wide-angle lenses 201, 205 installed at the edge of the detected screen, preferably at the corners, and the telephoto lenses 203,207 respectively. The telephoto lenses pick up the images on the imaging screens 202 and 206 respectively and project them on the different photosensitive areas 301 and 302 of the image sensing element 102 through the reflection mirrors 501 and 502 as the fourth reflection mirrors respectively. In fact, the structure shown in FIG. 2 may also be used for the area division multiplex, as long as the reflection mirror 208 and the reflection/transmission mirror 204 originally installed in an overlapped way are replaced by the reflection mirrors 401 and 402 which are installed in parallel based on the locations of the areas 301 and 302 of the photosensitive surface of the image sensing element, as shown in FIG. 4. In FIG. 6, the two reflection mirrors 501 and 502 are arranged in parallel with their reflection surfaces faced to the corresponding photosensitive areas. FIG. 4 is different from FIG. 6 in that the distances between the reflection mirror 401, 402 and the photosensitive surface are different.

Figure 7:
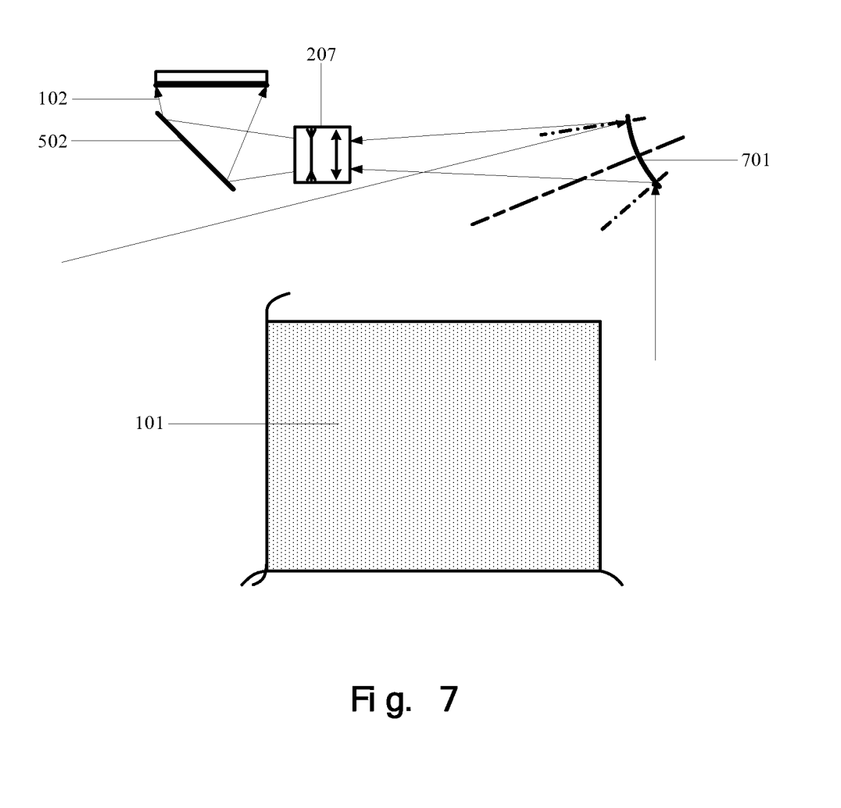
FIG. 7 is a diagram of another structure of a wide-angle lens in the structure of FIG. 2 or FIG. 5.

FIG. 7 shows a simplified structure of FIGS. 2 and 4, in which only one optical path is shown and the other optical path is the same. In this structure, the first lens 201 is replaced with a convex mirror 701 which can be used as the imaging screen behind the lens and can ensure the fields of view covered by the two optical paths and the overlapping area are large enough. However, because the image reflected by the convex mirror has larger distortion than the image formed on the imaging screen 206 by the wide-angle lens, appropriate compensation is required to correct the distortion.

Figure 8:
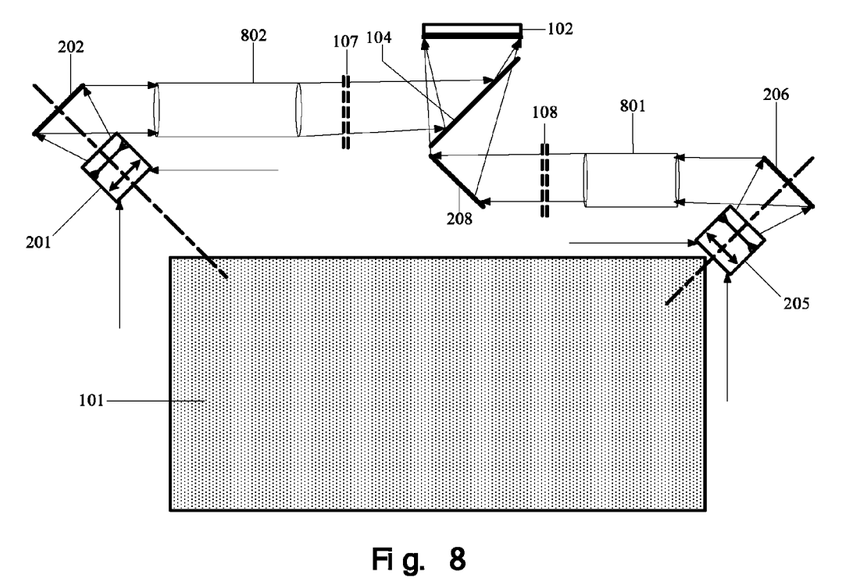
FIG. 8 is a structure diagram of a fifth embodiment according to the present invention.

The image sensing apparatus for the touch screen shown in FIG. 8 is similar to the image sensing apparatus for the touch screen shown in FIG. 2, and only some elements on the two optical paths are different. As shown in FIG. 8, on each optical path, the light reaches the reflection mirror through the lens, then enters into a multi-mode fiber after reflected by the reflection mirror, and reaches the electronic shutter after propagated by the multi-mode fiber. The subsequent process is same as that in FIG. 2, and the related description is omitted. In real application, the multi-mode fiber can be replaced with a single-mode fiber in the image sensing apparatus shown in FIG. 8. The image sensing apparatus for the touch screen shown in FIG. 8 operates with time division multiplex.

Figure 9:
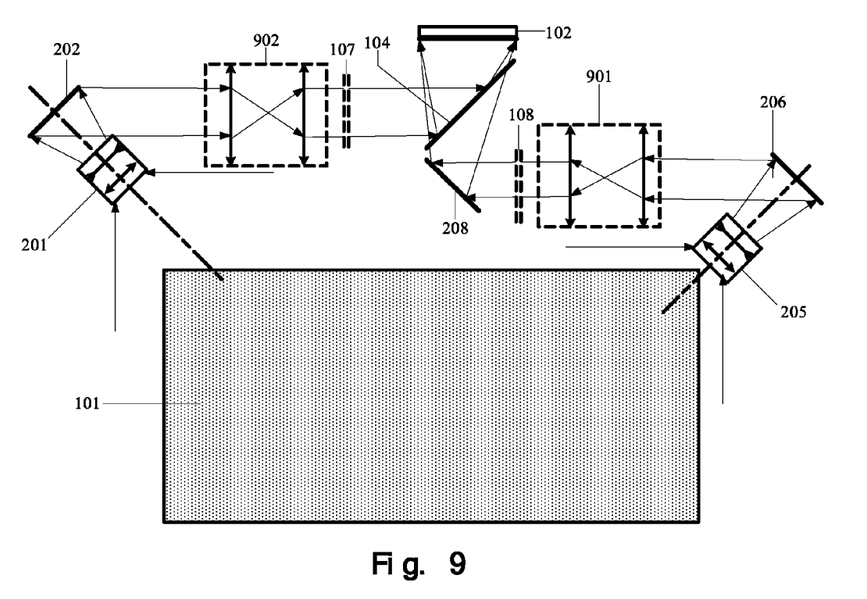
FIG. 9 is a structure diagram of a sixth embodiment according to the present invention.

The image sensing apparatus for the touch screen shown in FIG. 9 is similar to the image sensing apparatus for the touch screen shown in FIG. 8, and only some elements on the two optical paths are different. As shown in FIG. 9, on each optical path, the light reaches the reflection mirror through the lens, then enters into a lens group including a convex lens after reflected by the reflection mirror, and reaches the electronic shutter through the lens group. The subsequent process is same as that in FIG. 8, and the related description is omitted.

Figure 10:
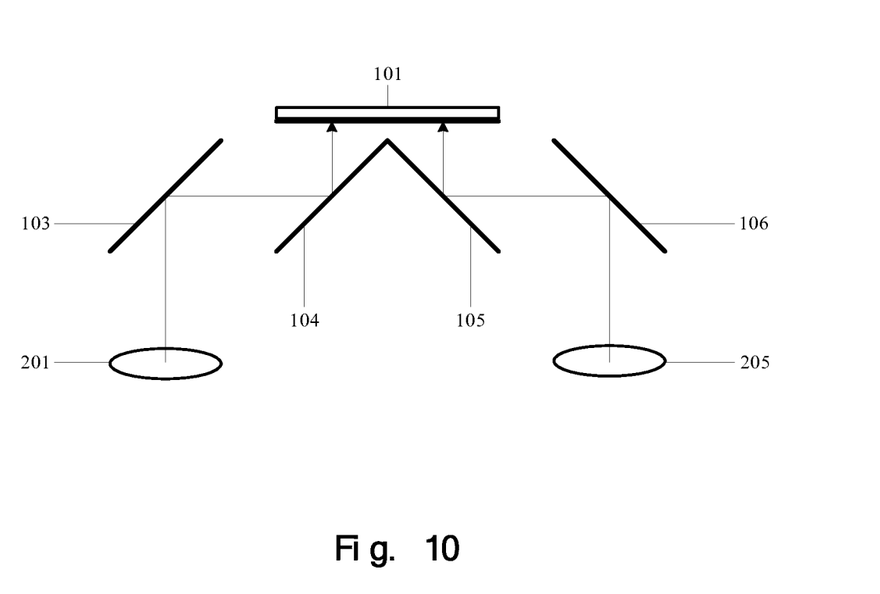
FIG. 10 is a diagram of a basic optical path structure when using a linear array photoelectric image sensing element.

In addition, for the above solution with the two lenses installed in front of the sensor chip, as indicated by the thick solid lines in FIG. 1, when the sensor chip employs time division multiplex, the electronic shutters 107 and 108 can be installed on the optical paths, the images are formed on the whole photosensitive surface of the sensor chip. When the sensor ship employs area division multiplex, the images are formed directly on the partitioned areas of the photosensitive surfaces of the sensor chip. When using the simplest structure to detect the touch object by area division multiplex, the preferable solution is that the sensor ship is horizontally partitioned into two areas, as opposite to the longitudinal partition shown in FIG. 3, and two lenses are installed parallel to the surface of the detected screen 101. FIG. 10 shows a simplest structure of horizontal partition, in which the image sensing element is a photoelectric sensor with linear array structure. The linear array photoelectric sensor may be considered as a special image sensing element with pixel in the width (vertical) direction being 1. For example, a linear array of 1×4096 can not be longitudinally partitioned and can be partitioned into left and right parts in the horizontal direction. The two parts correspond to the two optical paths represented by the lenses 201, 205 respectively. Since the size, shape and image of the touch object on the display surface in normal direction does not affect the capture of the touch object, the linear array sensor may be used.

The above embodiments do not describe the prior art, such as optical path, lens design and the like. The solution in which there are more than two optical paths is not provided, nor is the technical solution in which a single imaging system with two optical paths does not cover the whole display screen and more imaging systems with two optical paths are used to cover the whole display screen to realize touch detection provided. Therefore, the scope of the present invention is not limited to the above embodiments.

What is claimed is:

1. An image sensor for a touch screen, which is installed at an edge of the touch screen and comprising a single image sensing element and an optical imaging system, the optical imaging system having at least two optical paths comprising two separated lenses installed at the edge of the touch screen, a first reflection mirror and a reflection/transmission mirror;

wherein each of the lenses includes a concavo-convex lens, an objective lens of each of the lenses is faced to the touch screen, an overlapping area of fields of view of the objective lenses covers the touch screen;

wherein one of the two lenses, the first reflection mirror and the reflection/transmission mirror forms a first optical path, and the other of the two lenses and the reflection/transmission mirror forms a second optical path;

wherein a reflection surface of the first reflection mirror is opposite to a reflection surface of the reflection/transmission mirror which is towards the image sensing element;

wherein light emitted from the lens on the first optical path reaches a surface of the image sensing element through the first reflection mirror and the reflection surface of the reflection/transmission mirror;

wherein light emitted from the lens on the second optical path reaches the surface of the image sensing element through a transmission surface of the reflection/transmission mirror; and wherein a touch object on the touch screen is imaged by each of the first and second optical paths in the optical imaging system, and the formed images are projected on the image sensing element.

2. The image sensor according to claim 1, wherein the optical imaging system further comprises a second reflection mirror and a third reflection mirror located on the second optical path, wherein a reflection surface of the second reflection mirror is faced to a reflection surface of the third reflection mirror which is towards the transmission surface of the reflection/transmission mirror;

wherein light emitted from the lens on the second optical path reaches the surface of the image sensing element through the second reflection mirror, the third reflection mirror and the transmission surface of the reflection/transmission mirror.

3. The image sensor according to claim 1, wherein the optical imaging system, on each of the optical paths, further comprises an electronic shutter, wherein the electronic shutter on each of the optical path opens and closes sequentially in an interlocked manner.

4. An image sensing apparatus for a touch screen, comprising: an image sensor according to claim 1, and a control processor for controlling operation of the image sensor and processing signals received by the image sensor.

5. An image sensor for a touch screen, which is installed at an edge of the touch screen and comprising a single image sensing element and an optical imaging system, the optical imaging system having at least two optical paths comprising two separated lenses installed at the edge of the touch screen, two imaging screens installed at an imaging position of the respective lenses, two second lenses with its objective lens facing the imaging screen, a reflection/transmission mirror and a reflection mirror;

wherein a reflection surface of the reflection mirror is towards a transmission surface of the reflection/transmission mirror;

wherein each of the lenses includes a concavo-convex lens, an objective lens of each of the lenses is faced to the touch screen, an overlapping area of fields of view of the objective lenses covers the touch screen;

wherein light emitted from the lens on a first optical path reaches a surface of the image sensing element through the imaging screen, one of the two second lens and the reflection surface of the reflection/transmission mirror;

wherein light emitted from the lens on a second optical path reaches the surface of the image sensing element through the other imaging screen, the other second lens, the reflection mirror and the transmission surface of the reflection/transmission mirror; and wherein a touch object on the touch screen is imaged by each of the first and second optical paths in the optical imaging system, and the formed images are projected on the image sensing element.

6. The image sensor according to claim 5, wherein a single/multi-mode fiber or a lens group including a convex lens is used as the second lens on each of the optical paths.

7. The image sensor according to claim 5, wherein a convex mirror is used as the lens and the imaging screen on each of the optical paths, wherein light reflected by the convex mirror reaches the objective lens of the second lens.

8. The image sensor according to claim 5, wherein the lens is a wide-angle lens and the second lens is a telephoto lens.

9. An image sensor for a touch screen, which is installed at an edge of the touch screen and comprising a single image sensing element and an optical imaging system, the image sensing element being partitioned into image sensing areas;

the optical imaging system having at least two optical paths comprising two separated lenses, installed at the edge of the touch screen, two imaging screens installed at an imaging position of the respective lenses, two second lenses with its objective lens facing the imaging screen, and two reflection mirrors being located at an input side of each of the image sensing areas of the image sensing element;

wherein each of the lenses includes a concavo-convex lens, an objective lens of each of the lenses is faced to the touch screen, an overlapping area of fields of view of the objective lenses covers the touch screen;

wherein light emitted from the lens on a first optical path reaches a surface of the image sensing element through the imaging screen, one of the two second lens and a reflection surface of one of the two reflection mirrors;

wherein light emitted from the lens on a second optical path reaches the surface of the image sensing element through the other imaging screen, the other second lens, and the other reflection mirror; and wherein a touch object on the touch screen is imaged on the respective image sensing areas of the image sensing element by each of the first and second optical paths.

10. The image sensor according to claim 9, wherein a single/multi-mode fiber or a lens group including a convex lens is used as the second lens.

11. The image sensor according to claim 9, wherein a convex mirror is used as the lens and the imaging screen on each of the optical paths, wherein light reflected by the convex mirror reaches the objective lens of the second lens.

* * * * *

UNITED STATES PATENT AND TRADEMARK OFFICE
CERTIFICATE OF CORRECTION

PATENT NO.         : 8,451,252 B2  
APPLICATION NO.    : 12/921696  
DATED              : May 28, 2013  
INVENTOR(S)        : Xinlin Ye et al.

It is certified that error appears in the above-identified patent and that said Letters Patent is hereby corrected as shown below:

On the Title Page, under item (73) Assignee:
Please delete "Beijing Intouch Co., Ltd." and insert -- Beijing Irtouch Systems Co., Ltd. --

On the Title Page:

The first or sole Notice should read --

Subject to any disclaimer, the term of this patent is extended or adjusted under 35 U.S.C. 154(b) by 331 days.

Signed and Sealed this
Second Day of June, 2015

Michelle K. Lee
*Director of the United States Patent and Trademark Office*